United States Patent
Warr et al.

(10) Patent No.: US 8,341,519 B1
(45) Date of Patent: Dec. 25, 2012

(54) TAB ASSASSIN

(75) Inventors: Andy Warr, San Francisco, CA (US); Ben Laurie, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,805

(22) Filed: Sep. 26, 2011

(51) Int. Cl.
*G06F 3/048* (2006.01)
*G06F 17/00* (2006.01)
*G06F 17/21* (2006.01)
*G06F 17/22* (2006.01)

(52) U.S. Cl. .......... 715/243; 715/764; 715/772

(58) Field of Classification Search .......... 715/234, 715/764, 772
See application file for complete search history.

(56) References Cited

U.S. PATENT DOCUMENTS

| | | | | |
|---|---|---|---|---|
| 7,774,366 | B2 * | 8/2010 | Fisher et al. | 707/784 |
| 7,921,372 | B2 * | 4/2011 | Sauve et al. | 715/767 |
| 2006/0277472 | A1 * | 12/2006 | Yodo et al. | 715/738 |
| 2007/0128899 | A1 * | 6/2007 | Mayer | 439/152 |
| 2011/0145750 | A1 * | 6/2011 | Yodo et al. | 715/772 |
| 2011/0271217 | A1 * | 11/2011 | Cruz Moreno et al. | 715/765 |
| 2011/0314408 | A1 * | 12/2011 | Yolleck et al. | 715/777 |

OTHER PUBLICATIONS

Dubroy et al, "A Study of Tabbed Browsing Among Mozilla FireFox Users", ACM, 2010, pp. 673-682.*
Moryl et al, "Web of Tabs: Browsing Internet Information Intuitively", ACM, 2010, pp. 1-8.*
Mozilla, http://addons.mozilla.org/en-US/firefox/addon/autoclose-tabs/, Jul. 8, 2011, 8 pages.

* cited by examiner

*Primary Examiner* — Doug Hutton, Jr.
*Assistant Examiner* — Soumya Dasgupta
(74) *Attorney, Agent, or Firm* — Sterne, Kessler, Goldstein & Fox, P.L.L.C.

(57) ABSTRACT

Systems and methods for managing tabs are provided. Such systems and methods may monitor and identify tabs based on tab usage. A method for web page tab management may include determining if tabs have not been used beyond a tab use threshold. The method may also include removing tabs determined to not have been used beyond the tab use threshold. The method may further include storing information of the removed tabs that will enable the removed tabs to be restored in the web browser. A system for web page management may include a tab use determiner and a tab assassin. The system may also include a stored tab repository.

23 Claims, 5 Drawing Sheets

TAB ASSASSIN

BACKGROUND

1. Technical Field

Embodiments relate generally to web browser applications.

2. Background

Web browsers may be used to display news and sports information, weather information, on line forums (e.g., social and business networking forums, web blogs, bulletin boards, and online discussion forums), online shopping sites, and specialized and general purpose web search sites. Web browsers have been used to provide web based applications such as tax preparation software, office software (e.g., software for preparing documents, presentations, spread sheets, and databases), and game playing applications.

Web browser clients that support tabbed browsing are becoming increasing popular. Tabbed web browsers allow a user to open multiple browser windows, each having a corresponding tab for selecting the window. The tabs may be arranged in a tab area of the web browser client.

Figure 1:
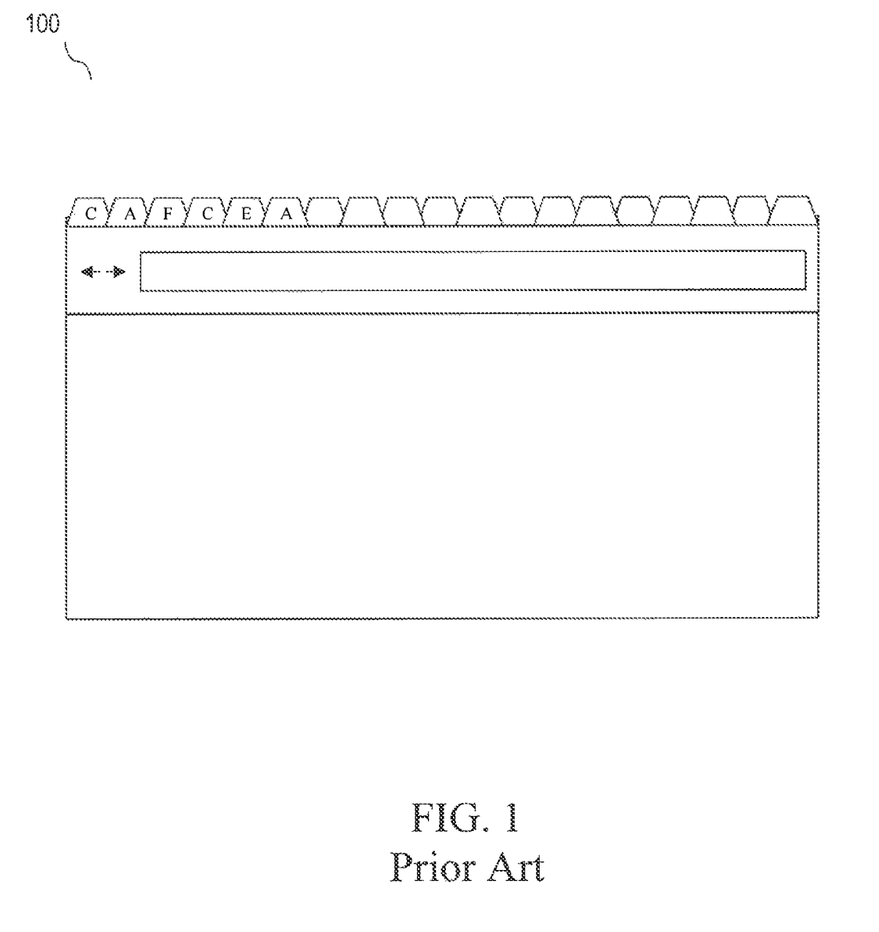
FIG. 1 is a diagram of an exemplary web browser window with many tabs open in accordance with an embodiment.

Users can efficiently switch between applications by selecting browser tabs. As the number of tabs increases, the effort required to locate and select the proper browser tab decreases the user's efficiency. FIG. 1 shows an exemplary web browser with many tabs open. As seen in the figure, the tabs become smaller and smaller as the number of open tabs increases, and it becomes more difficult for the user to determine the correct tab to select.

BRIEF SUMMARY

Embodiments for web page tab management are provided. Such a capability may also provide for automatically removing tabs that have not been used beyond a tab use threshold. The tabs may be restored if recently removed.

In an embodiment, a method for web page tab management includes determining a web browser tab of a plurality of open tabs that has not been used beyond a tab use threshold. The method also includes automatically removing the determined tab from the web browser window. The method further includes storing information of the removed tab that may be used to restore the tab in a web browser window.

In another embodiment, a system for web page tab management includes a tab use determiner configured to determine a tab that has not been used beyond a tab use threshold. The system also includes a tab assassin configured to remove the determined tab from its web browser window and store information of the removed tab that may be used to restore the tab in a web browser window.

In an embodiment, a method for application tab management includes determining a tab of an application window that has not been used beyond a tab use threshold. The method also includes automatically removing the determined tab from its application window. The method further includes storing information regarding the removed tab that may be used to restore the tab in an application window.

In a further embodiment, a computer readable storage medium has control logic stored therein that, when executed by a process, causes the processor to manage web page tabs. The control logic includes a first computer readable program code to cause the processor to determine a tab of a web browser that has not been used beyond a tab use threshold, a second computer readable program code to cause the processor to automatically remove the determined tab from its web browser window, and a third computer readable program code to cause the process to store information regarding the removed tab that may be used to restore the tab in a web browser window.

BRIEF DESCRIPTION OF THE DRAWINGS

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

DETAILED DESCRIPTION

Embodiments relate to managing tabs for accessing applications, such as web page tabs of a web browser executed on a client computer. Tabs are managed based on tab usage and automatically removed when they have not been used beyond a tab use threshold. For example, a user might have many tabs open in a web browser, but may only be actively using a few tabs. Tabs that have not been used in a configurable timeframe are determined and removed. The web browser may store information about the removed tabs to facilitate the restoration of those tabs if the user should choose to restore them.

Embodiments are described herein with reference to illustrations. It should be understood that the invention is not limited to the embodiments. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

For example, in the embodiments described below, client applications are Hypertext Markup Language (HTML) compatible tabbed browsers. The use of such browsers is exemplary, and other clients or applications that are capable of displaying tabbed windows providing access to multiple server applications or functions can be used.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 2:
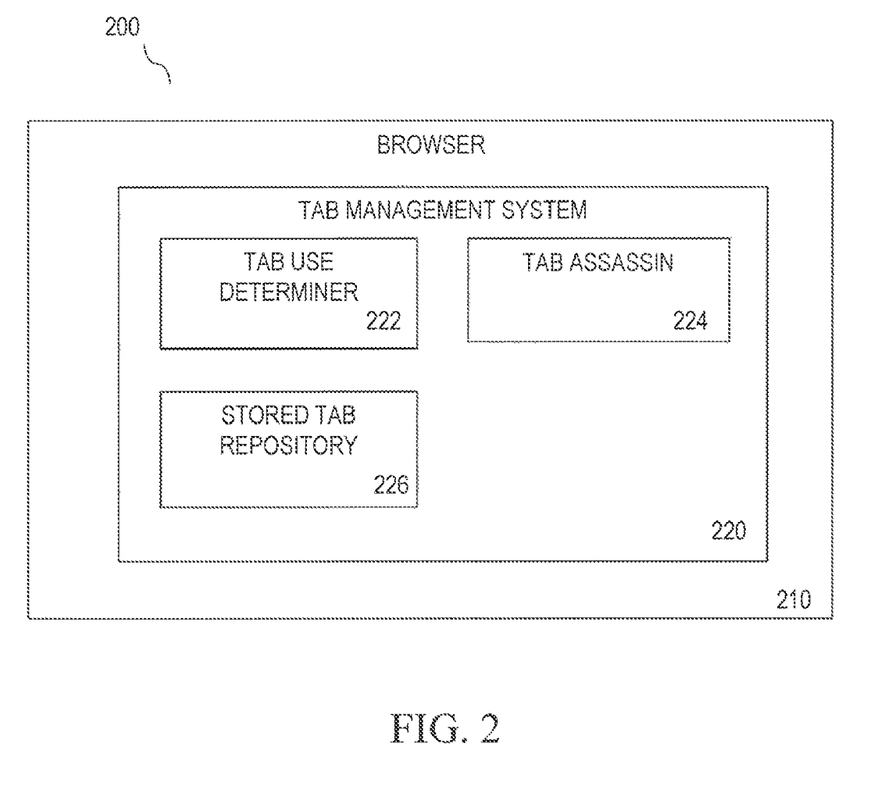
FIG. 2 is a diagram of an exemplary web browser system suitable for practicing an embodiment.

FIG. 2 is a diagram of a browser system 200 for web page tab management, according to an embodiment. Exemplary system 200 includes web browser 210 executing by a computing device. The computing device may be configured to store and execute instructions and to carry out operations associated with system 200. In an embodiment, the computing device can be implemented on a single computing device such as, for example and without limitation, a stand-alone device. The computing device can be based on processing devices that include, but are not limited to, programmable logic arrays, application-specific integrated circuits, and central processing units that have at least one processor and memory. In another embodiment, computing device can have multiple processors and multiple shared or separate memory components such as, for example and without limitation, one or more computing devices incorporated in a clustered computing environment or a server farm. The computing process can be performed by the clustered computing environment, or server farm, and may be carried out across multiple processors located at the same or different locations.

The computing device may include a display device for presenting text and graphical information. The display device can be, for example and without limitation, a liquid crystal display, a plasma display, a computer monitor (e.g., a variable graphics array (VGA) display, a super VGA display, and a cathode ray tube display), and other similar types of display devices. In an embodiment, the display device can be configured to display a graphical user interface (GUI) that provides an interface between a user and the computing device or an application running on the computing device (also referred to herein as a "system application"). The system application can be, for example and without limitation, an email application, a multi-media display application, a document generating application, or a video game. Features of the GUI for the system application can be arranged in a predefined layout on the display device or can be generated dynamically to serve specific actions taken by the user, according to an embodiment. For instance, the GUI can display information such as interactive text and graphics for the user to select via an input device.

The computing device can be, for example, and without limitation, a personal computer system (e.g., desktop, laptop, tablet, and handheld computers), a personal digital assistant (PDA), mobile device, navigation device or a smart phone. The computing device can be configured to access content hosted on web servers over a network using browser 210. The network can be any network or combination of networks that can carry data communications. Such a network can include, but is not limited to, a wired (e.g., Ethernet) or a wireless (e.g., Wi-Fi and 3G) network. In addition, a network can include, but is not limited to, a local area network, medium area network, and/or wide area network such as the Internet. The network can support protocols and technology including, but not limited to, Internet or World Wide Web protocols and/or services. Intermediate network routers, gateways, or servers may be provided between servers and clients depending upon a particular application or environment.

Browser 210 may exist within or be executed by hardware in a computing device. For example, browser 210 may be software, firmware, or hardware or any combination thereof in the computing device. Browser 210 may include window areas for displaying visual content in a window from one or more selected web based applications, and tab areas for displaying tabs associated with open browser windows associated with web based applications. A user can select a window from a set of open windows for viewing in a window area by selecting a tab associated with the window and displayed in a tab area using an input device connected to or a touch screen on a computing device. For example, a user might use a pointing device connected to a computing device to select a particular tab, and in response to the selection, browser 210 may be configured to display the contents of a window associated with the selected tab in a window area.

According to an embodiment, tab management system 220 includes tab use determiner 222 and tab assassin 224. Tab management system 220 may also include stored tab repository 226. Tab use determiner 222 identifies tabs in browser 210 that have not been used longer than a tab use threshold. A tab use threshold may include a period of time or an amount of activity. This threshold may be determined or adjusted by a user. It may also be adjusted based on monitoring user activity and user patterns. Tab assassin 224 may automatically remove the tabs identified by the tab determiner 222 from the web browser 210. Stored tab repository 226 may store information about the automatically removed tabs so that the removed tabs can be restored.

Tab use determiner 222 utilizes a tab use threshold to determine whether a tab should be removed by tab assassin 224. Tab use determiner 222 may be configured to use various usage factors to determine tab usage. Accordingly, tab use determiner 222 may have several usage threshold values that correspond to different usage factors. In an embodiment, tab use determiner 222 may be configured to determine tab usage by monitoring tab selection. Tab use determiner 222 may then use a tab selection threshold value to compare to the actual tab selection. For example, tab use determiner 222 may monitor tab selection by a user and based on this monitoring it can determine the amount of time since each tab was selected. Tab use determiner 222 may then compare these times to the tab selection threshold time and indicate to tab assassin 224 which tabs have remained inactive longer than the threshold so that they may be considered for removal.

Various other factors may be monitored by tab use determiner 222 to determine tab usage. Such factors may include viewing time of a tab. For instance, tab use determiner 222 may monitor the amount of time that each tab was being viewed by the user. It may then compare the viewing time of each tab with a tab viewing threshold time and pass the tabs that have times that do not exceed the threshold to tab assassin 224 for removal. In another embodiment, the user activity in a web page of a tab is monitored. Tab use determiner 222 then compares the monitored user activity to a user activity threshold to determine which tabs to provide to tab assassin 224.

In another embodiment, the factors discussed above are monitored over a certain period of time. This period of time could be set by the user or by the tab management system itself. For example, a user could enable the tab use monitoring at a certain time and then may disable the monitoring at a later time. The user may also enable the tab use monitoring and set it to monitor for a given set of time such as one hour. This allows the user to control at what time and for how long tab management system 220 is monitoring and automatically removing unused tabs.

Tab management system 220 may also be automatically enabled. This automatic enabling may be triggered by a number of open tabs threshold. For example, tab management system 220 may be automatically enabled if there are more open tabs than the open tabs threshold value. This allows users to set the open tabs threshold and let the tab management system 220 automatically enable and disable itself. In another embodiment, tab management system 220 is enabled only when the browser 210 is in use. For example, if browser 210 is minimized or not actively being used, tab management system 220 may not monitor tab usage for the time the browser is not being used. This allows the user to use other applications without having to worry about tab management system 220 automatically closing the tabs in the browser due to inactivity.

According to an embodiment, the tab use determiner 222 is configured to only monitor unpinned tabs. A user may "pin" tabs that are used often. Pinned tabs may shrink in tab size, leaving a favicon, or small icon representing the web page represented by the tab. Pinned tabs may also automatically move to the left or right of the tab space. Pinned tabs can be much smaller than standard tabs. A pinned tab may not have a visible way of closing the tab to prevent the user from inadvertently closing the frequently used tab. Likewise, it may not be desirable for the tab management system 220 to automatically close the pinned tab if the user has not used the tab beyond a tab use threshold. Therefore, tab use determiner 222 may be configured to only monitor unpinned tabs. In some cases, tabs selected to be assassinated may be pinned for a period of time before being assassinated. In other cases, pinned tabs may be subject to assassination, but only after a second criteria has been met, such as inactivity over a longer period of time.

Tab assassin 224 may be configured to automatically remove the tabs identified by tab determiner 222 from a window of web browser 210. Tab use determiner 222 may provide one or more unused tabs to tab assassin 224 for removal. Information about these tabs may then be stored by tab assassin 224. Stored tab repository 226 to be useful in restoring the removed tabs. After the information is stored, tab assassin 224 may then remove the tab from the browser window.

Figure 4:
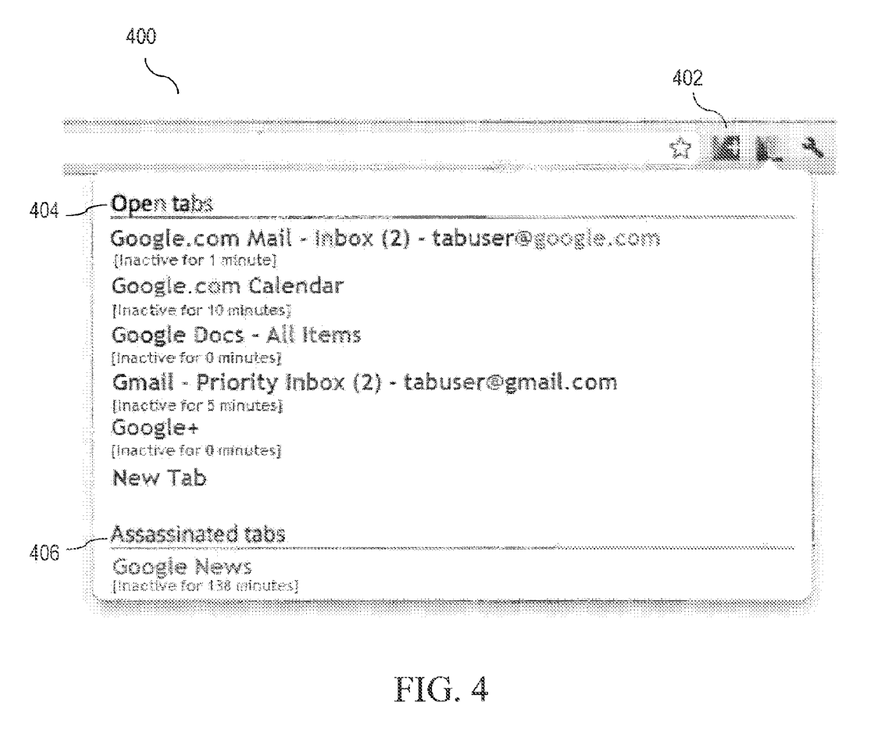
FIG. 4 is an illustration of an exemplary interface to display information in accordance with an embodiment.

The user is able to see a list of the tabs that are removed by the tab assassin 224. An exemplary embodiment of this list is shown in FIG. 4. The assassinated tabs list 406 shows the title of the removed tab and may also show information related to the usage of the removed tab and/or reasons for the tabs removal. Assassinated tabs list 406 allows a user a method to restore tabs that have been removed by tab assassin 224. For instance, as shown in FIG. 4, a news tab was removed by tab assassin 224, and therefore is shown in assassinated tabs list 406. To restore the news tab to the browser window, a user may click on the news tab listing in assassinated tabs list 406. The amount of time a removed tab may be listed in assassinated tabs list 406 is configurable by the user, with a default amount of time set to one day.

Stored tab repository 226 may be configured to store information about the automatically removed tabs to enable the restoration of the removed tabs. The information stored about a removed tab may be a uniform resource locator (URL) address. For instance, in FIG. 4 for the removed news tab, stored tab repository may contain the URL address for the news site. This URL address allows the browser to restore the news tab if the user chooses to restore the removed tab.

In another embodiment, stored tab repository 226 stores a copy of the complete web page that was contained in the removed tab. This may comprise the HTML, scripting languages, images, and other necessary files to allow the browser to render the web page as it was before it was removed.

Figure 3A:
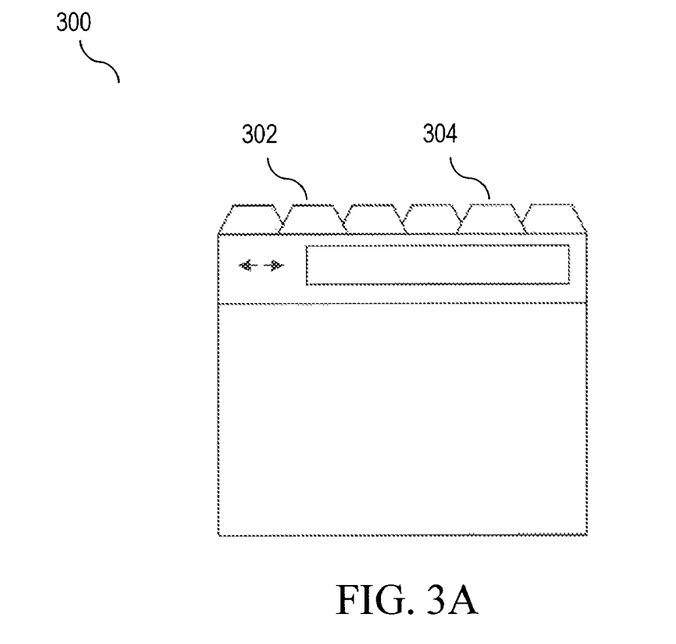
FIGS. 3A and 3B are diagrams that schematically illustrate a browser with tabs suitable for practicing an embodiment.
Figure 3B:
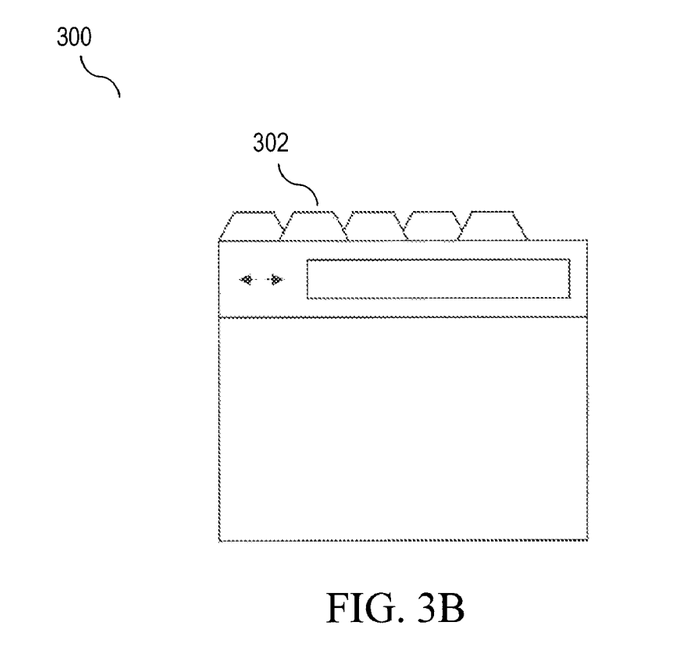

FIGS. 3A and 3B illustrate tabs in an example tabbed browser 300, according to an embodiment. Tabbed browser 300 is managed by tab management system 220 shown in FIG. 2. FIG. 3A shows several open tabs on browser 300. In the illustrated example, browser tab 302 is an active tab and browser tab 304 is an inactive tab.

FIG. 3B illustrates the tabs on browser 300 at a time after FIG. 3A. In FIG. 3B, tab use determiner 222 of tab management system 220 determines that tab 304 has not been used for a period of time longer than a threshold amount of time and the tab assassin 224 removes the tab 304 from the browser using methods described above with reference to FIG. 2.

FIG. 4 is an exemplary display view of a list of open and assassinated tabs in a window of browser 210. An icon, such as extension icon 402 may be visible in the browser window to allow the user view the list of open tabs 404 and assassinated tabs 406. This information may be stored in arrays or folders in memory. These listings may show the title of the tab and may also show information related to the usage of the tab and/or reasons for the tabs removal. The user can restore assassinated tabs from this interface as discussed above in reference to FIG. 2. In some cases, assassinated tabs may be removed from the listing of assassinated tabs after a specified period of time.

Figure 5:
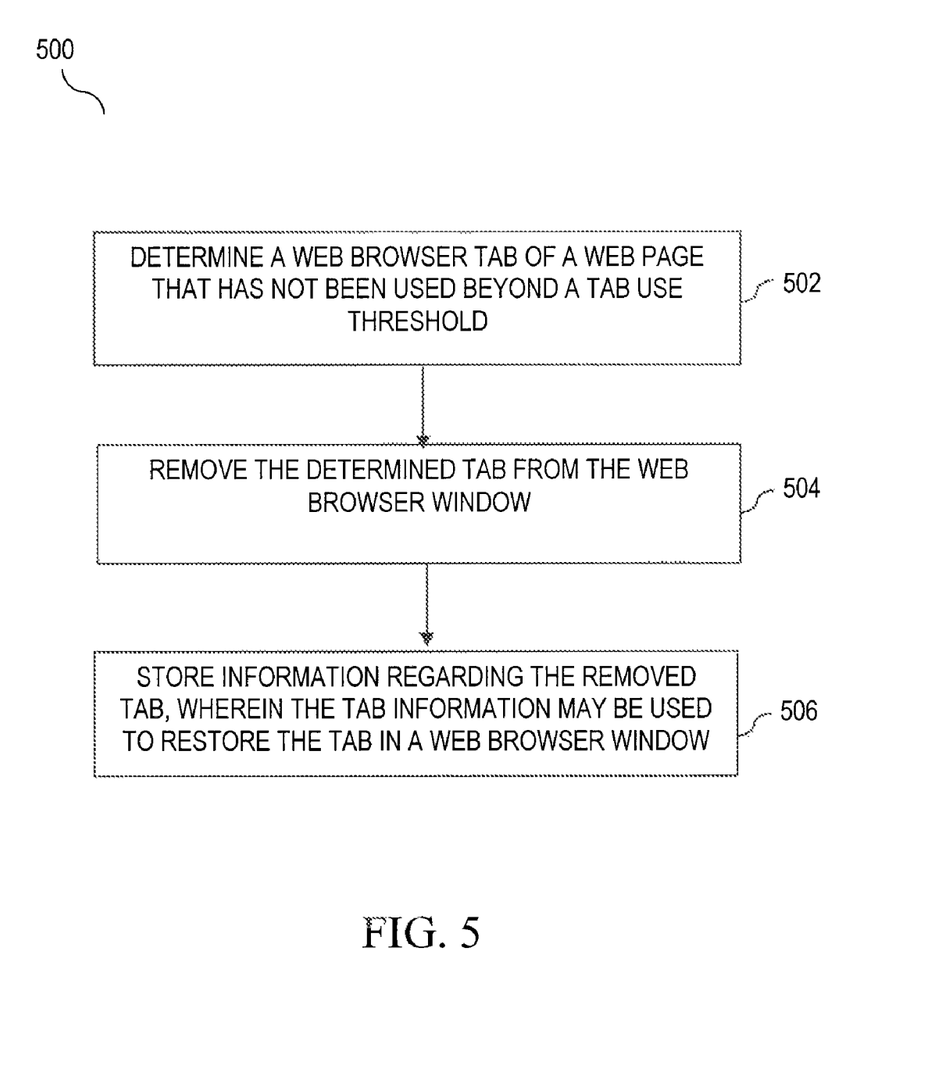
FIG. 5 is a flow chart illustrating a method in accordance with an embodiment.

FIG. 5 is a flow chart illustrating an exemplary method 500 of an embodiment. While method 500 is described with respect to an embodiment of the present invention, method 500 is not meant to be limiting and may be used in other applications. In an example, method 500 may be used to manage tabs based on tab usage using browser system 200 of FIG. 2. However, method 500 is not meant to be limited to browser system 200.

As shown in FIG. 5, exemplary method 500 begins at step 502 with determining a web browser tab of a web page that has not been used beyond a tab use threshold. Various factors may be used to determine tab asage, such as tab selection. In some cases, the viewing time or user activity of a tab may be utilized to determine tab usage. Patterns and frequency algorithms, such as the frequency of tab visits within short and/or long periods of time may be analyzed. Other patterns may be considered, including regular periodic visits that involve greater amounts of time in between visits (e.g., weekly). According to a further embodiment, tab usage may only be monitored while the browser 210 is in use or expected to be in use.

In step 504, the determined web browser tab is removed from the web browser window. For instance, step 502 may determine that two tabs have not been used beyond a tab use threshold. The two tabs may then be automatically removed.

In step 506, information about the removed tabs may be stored to enable the restoration of the removed tabs. For example, the information stored may be a URL address. In some cases, the information stored may comprise the HTML, scripting languages, images, and other necessary files to allow the restoration of the tab. The amount of time the information about a removed tab may be stored is configurable by the user, with an example default amount of time set to one day.

Embodiments may be directed to a computer readable storage medium comprising software stored on any computer useable medium. Such software, when executed in one or more data processing devices, causes a data processing device (s) to operate as described herein. Embodiments employ any computer useable or readable medium. Examples of non-transitory computer readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Additional computer readable medium can include communication mediums (e.g., wired and wireless communications networks, local area networks, wide area networks, intranets, etc.).

As would be understood by a person skilled in the art based on the teachings herein, several variations of the above described features of systems and methods for managing browser tab windows can be envisioned. These variations are within the scope of embodiments.

The Summary and Abstract sections may set forth one or more but not all exemplary embodiments as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for web page tab management, comprising:
   monitoring, by a processor-based device, use of a web browser tab provided in a web browser window;
   determining, by the processor-based device based on the monitoring, when the tab has not been used beyond a tab use threshold;
   removing, by the processor-based device, the determined tab automatically from the web browser window, based on the determination that the tab has not been used beyond the tab use threshold;
   storing, by the processor-based device, information about the removed tab, wherein the information includes one or more reasons for removing the tab from the web browser window; and
   providing, by the processor-based device, an interface within the web browser window configured to allow restoration of the removed tab within the web browser window, wherein the interface presents at least one of the one or more reasons describing why the tab was previously removed from the web browser window.

2. The method of claim 1, wherein the monitoring includes monitoring tab selection.

3. The method of claim 1, wherein the monitoring includes monitoring viewing time of a web page of a tab.

4. The method of claim 1, wherein the monitoring includes monitoring user activity in a web page of a tab.

5. The method of claim 1, wherein the monitoring includes monitoring tab use over a certain period of time.

6. The method of claim 1, wherein the monitoring includes monitoring a frequency of tab use.

7. The method of claim 1, wherein the monitoring includes monitoring patterns of tab use.

8. The method of claim 1, wherein the determining includes analyzing tab use only when the web browser is in use.

9. The method of claim 1, wherein the determining includes analyzing tab use only for unpinned tabs.

10. The method of claim 1, wherein the storing includes storing removed tab information for a defined period of time before the stored removed tab information is removed.

11. The method of claim 1, wherein the tab information includes uniform resource locators (URLs), HTML, scripting language scripts and images necessary to restore the web page.

12. A system for web page tab management, comprising:
   a tab use monitor implemented by a processor-based device and configured to monitor use of a web browser tab provided in a web browser window;
   a tab use determiner implemented by the processor-based device and configured to determine when the tab has not been used beyond a tab use threshold, based on the tab use monitoring by the tab use monitor;
   a tab assassin implemented by the processor-based computing device and configured to:
      remove the determined tab automatically from the web browser window, based on the determination that the tab has not been used beyond the tab use threshold; and
      store information about the removed tab, wherein the information includes one or more reasons for removing the tab from the web browser window; and
      provide an interface within the web browser window configured to allow restoration of the removed tab within the web browser window, wherein the interface presents at least one of the one or more reasons describing why the tab was previously removed from the web browser window.

13. The system of claim 12, wherein the tab use monitor is further configured to monitor tab selection.

14. The system of claim 12, wherein the tab use monitor is further configured to monitor viewing time of a web page of a tab.

15. The system of claim 12, wherein the tab use monitor is further configured to monitor user activity in a web page of a tab.

16. The system of claim 12, wherein the tab use monitor is further configured to monitor tab use over a certain period of time.

17. The system of claim 12, wherein the tab use monitor is further configured to monitor a frequency of tab use.

18. The system of claim 12, wherein the tab use monitor determiner is further configured to monitor patterns of tab use.

19. The system of claim 12, wherein the tab use determiner is further configured to analyze tab use only when the web browser is in use.

20. The system of claim 12, wherein the tab use determiner is further configured to analyze tab use only for unpinned tabs.

21. The system of claim 12, wherein the tab assassin is further configured to store removed tab information for a defined period of time before the stored removed tab information is removed.

22. A computer-implemented method for application tab management, comprising:
   monitoring, by a processor-based device, use of a tab provided in an application window;
   determining, by the processor-based device, when the tab has not been used beyond a tab use threshold based on the monitoring;

removing, by the processor-based device, the determined tab automatically from the application window, based on the determination that the tab has not been used beyond the tab use threshold;

storing, by the processor-based device, information about the removed tab, wherein the information includes one or more reasons for removing the tab from the application window; and providing, by the processor-based device, an interface within the application window configured to allow restoration of the removed tab within the application window, wherein the interface presents at least one of the one or more reasons describing why the tab was previously removed from the application window.

23. A non-transitory computer readable storage medium having control logic stored therein that, when executed by a processor, causes the processor to manage web page tabs, the control logic comprising:

a first computer readable program code to monitor use of a web browser tab provided in a web browser window;

a second computer readable program code to cause the processor to determine when the tab has not been used beyond a tab use threshold based on the monitoring;

a third computer readable program code to cause the processor to automatically remove the determined tab from the web browser window, based on the determination that the tab has not been used beyond the tab use threshold;

a fourth computer readable program code to cause the processor to store information about the removed tab, wherein the information includes one or more reasons for removing the tab from the web browser window; and a fifth computer readable program code to cause the processor to provide an interface within the web browser window configured to allow restoration of the removed tab within the web browser window, wherein the interface presents at least one of the one or more reasons describing why the tab was previously removed from the web browser window.

* * * * *